United States Patent [19]

Toalson

[11] 4,396,884
[45] Aug. 2, 1983

[54] ULTRA SLOW SPEED TACHOMETER

[76] Inventor: David C. Toalson, 861 White Oak, Bellville, Tex. 77418

[21] Appl. No.: 221,300

[22] Filed: Dec. 30, 1980

[51] Int. Cl.$^3$ ............................ G01P 3/44; G01P 3/48
[52] U.S. Cl. ...................................... 324/163; 324/166
[58] Field of Search .................... 324/163, 166, 78 E, 324/78 J, 167, 168, 173, 178; 328/140; 329/107

[56] References Cited

U.S. PATENT DOCUMENTS 3,553,597 1/1971 Bugay .................................. 328/140
3,743,940 7/1973 Yamagata ......................... 324/78 E Primary Examiner—Ernest F. Karlsen
Attorney, Agent, or Firm—Gunn, Lee & Jackson

[57] ABSTRACT

In order to develop a suitable analogous voltage to the speed of operation of slow moving machinery having cyclical characteristics, the instant invention provides means for generation of a repetitive electrical input signal for each revolution of cycle of machine operation. The time between repetitions of the input signal is measured, the reciprocal of the elapsed time between cycles or revolutions is calculated, appropriately scaled, and presented as a voltage analog which is proportional to the speed at which the machinery operates. This voltage analog signal may be utilized in conjunction with analog or digital totalizing circuitry to provide totalized signals that may be used to identify the point at which preventative maintenance should be conducted.

14 Claims, 2 Drawing Figures

ULTRA SLOW SPEED TACHOMETER

FIELD OF THE INVENTION

This invention relates generally to the field of tachometry and more particularly to the field of ultra-low speed tachometry as it relates to either rotating or reciprocating machinery. Even more specifically, the present invention involves electronic circuitry for use in conjunction with slow moving machinery and which obtains an electrical input signal from the machinery which represents each revolution or cycle of machine operation. Input signals, from the machinery, are appropriately processed to yield a voltage analog which is proportional to the speed at which the machinery operates and which analog may be totalized to provide indications for proper preventative maintenance and servicing of the machinery.

BACKGROUND OF THE INVENTION

In the field of tachometry, two basic concepts have evolved. The first, and most conventional, involves the application of a tachogenerator producing a variable voltage alternating or direct current with voltage proportional to the speed at which the generator revolves. This system provides good accuracy over a wide speed range, but has the inherent disadvantage of possessing moving part which are subject to wear and require periodic maintenance. Additionally, if it is desired to measure the speed of machinery which operates at speeds of less than 5 revolutions per second, it is frequently necessary to overdrive the tachometer with respect to the machinery to be measured. This overdriving, or speed increasing mechanism involves the use of gears or belts and sheaves which themselves result in further complexity and inaccuracy and provide the additional requirement for efficient maintenance of the tachogenerator mechanism.

The second basic concept for measuring the speed of rotating or reciprocating machinery involves the use of means to detect the presence or absence of moving parts (for example, the teeth of a gear) and computes the speed of the parent machinery by generating a series of pulses of a fixed amplitude and duration by means of a monostable multivibrator (one pulse for each gear tooth, for example) then integrating the area of the pulses over a given period of time by means of a filter to produce a direct current analog signal proportional to the speed of the subject machinery. This same means is normally employed when the signal source is an alternating current tachogenerator, the frequency output of which is proportional to the speed of the machinery under measurement. The time constant of the integrating filter is a function of the frequency of pulses; that is, the lower the frequency of the AC signal or the repetition rate of the pulses, the longer must be the time constant of the filter in order to produce an analog signal reasonably free from ripple. This does not produce a problem at higher frequencies or pulse rates such as pulse rates of ten cycles per second or greater, but at low pulse rates such as pulse rates of less than two cycles per second, the time constant of the integrating filter produces serious lags in the response time for the system. For example, in response to a step change in input frequency of from 1 Hertz to 2 Hertz, a typical delay of ten to thirty seconds in response may be anticipated due to the long time constant of the integrating filter. This phenomena is often intolerable, and leads to the introduction of mechanical overdriving means to increase the input frequency of the tachometer. Obviously, the requirement for providing mechanical overdriving means introduces both electrical and mechanical disadvantages which may add materially to the cost of such system and which also introduces requirements for additional maintenance.

THE PRIOR ART

Apparatus for measuring and displaying or recording the velocity of moving equipment and various electronic circuits of general interest to the present invention are exemplified by the following prior art references:

S. Overstreet, U.S. Pat. No. 3,656,059 on "Single Sensor Motor Vehicle Velocity Detector" issued Apr. 11, 1972 discloses a system having a start/stop control circuit and a ramp generator which applies an input to a sample and hold circuit controlled by the start/stop control circuit to provide a voltage level which is a function of velocity. A reset delay 54 is also responsive to the start/stop control circuitry.

W. Kinard et al, U.S. Pat. No. 3,296,526 on "Micro Meteroid Velocity Measuring Device" issued Jan. 3, 1967 teaches the concept of any length sensing means adapted to trigger a bistable multivibrator whose output is integrated to create a sawtooth wave-form, the maximum amplitude of which is sampled and held to provide an analog voltage representing velocity.

V. Bischoff, U.S. Pat. No. 3,600,955 on "Ink Drop Velocity Indicator" issued Apr. 24, 1971 is a further example of an event sensing device in combination with means to create a ramping voltage between events and means whereby the voltage achieved by the ramp is interpreted as a velocity function.

C. Chilton, U.S. Pat. No. 3,675,126 on "Commutated Motor Speed Measuring Means" issued July 4, 1972 discloses a system which determines angular velocity of a machine by measuring the time between subsequent occurrences indicative of a predetermined angular motion of the machine.

SUMMARY OF THE INVENTION

It is a principal objective of the present invention to provide accurate tachometry of low speed moving machinery without the introduction of mechanical speed increasers or tachogenerators and which does not depend upon rapidly moving gear teeth or other such multiple objects per revolution for development of multiple signals per cycle.

It is a further feature of the present invention to produce response time which will accurately reflect machine speed within one full cycle of machine operation regardless of the speed at which the operation occurs.

Other and further objects, advantages and features of the present invention will become apparent to one skilled in the art upon consideration of this entire disclosure. The form of the invention, which will now be described in detail, illustrates the general principles of the invention but it is to be understood that this detailed description is not to be taken as limiting the scope of the present invention.

In order to accomplish the foregoing objectives, a proximity-type metal detector or other suitable device is employed to provide a signal corresponding to the movement of some part of the machinery. This may be any convenient part, for example, a bolt or bolts in the bolt circle of a gear or sheave, a hole in a moving part or a reciprocating part such as a crosshead or valve mechanism, such as is typical in reciprocating piston pump mechanisms. This proximity-type device which may function by means of Hall-Effect, photoelectric or oscillator resonance and the like, provides a variation in signal level each time the subject part or parts of the machine become proximate to the detector. Thus, it may be readily seen that for each revolution or reciprocation of the machine one (or more) changes occur in the level of the input circuitry. This change in level is applied to the input circuitry of the tachometer.

The tachometer circuitry will process the incoming machine movement signal to achieve measurement of the elapsed time between cycles or repetitions of machine operation. The circuitry will then calculate the reciprocal of elapsed time between cycles, appropriately scale the calculations and present the scaled calculations as a voltage analog which is proportioned to the speed at which the machinery operates. The tachometer circuitry is also capable of sensing the absence of machine movement for preselected periods and place itself in a constant "sample" mode so that the tachometer will remain in a ready but inactive state until subsequent incoming machine cycle signals indicate that machine operation has resumed. Output signals of the tachometer representing the speed of the machinery are displayed for inspection and may be totalized and used as an indicator for machine servicing and preventative maintenance.

BRIEF DESCRIPTION OF THE DRAWINGS

Preferred embodiments of the invention have been chosen for purposes of illustration and description and are shown in the accompanying drawings forming a part of this specification wherein.

DETAILED DESCRIPTION OF PREFERRED EMBODIMENT

Figure 1:
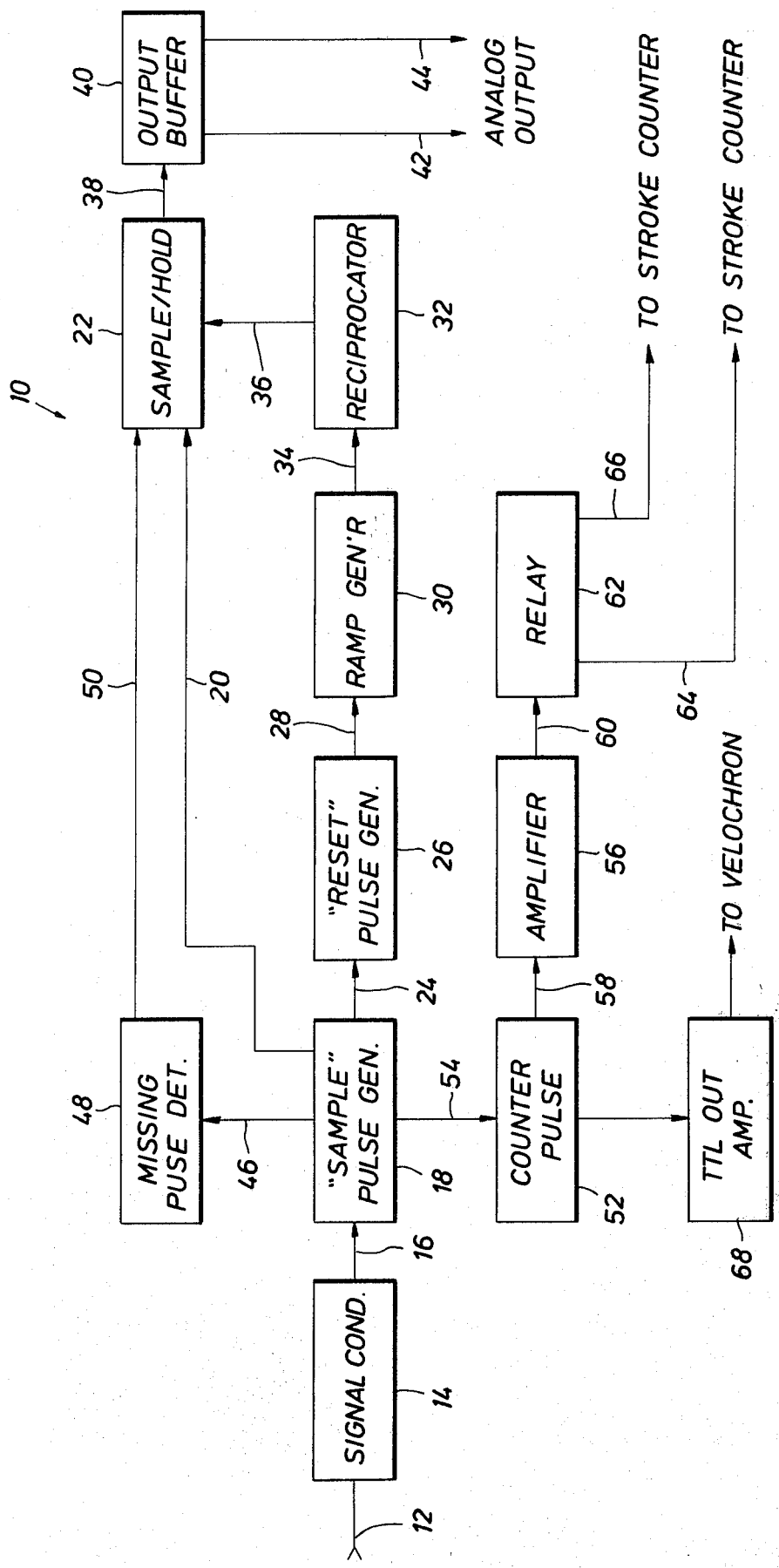
FIG. 1 is an electronic schematic in block diagram form illustrating electronic circuitry that represents a preferred embodiment of this invention.

Referring now to the drawings and first to FIG. 1 for a more detailed understanding of the present invention, electronic circuitry in block diagram form is illustrated generally at 10 having an input conductor 12 from which a signal conditioning circuit 14 receives electrical signals representative of machine operation. As indicated above, a proximity-type metal detector may be employed to provide a signal corresponding to the movement of some part of the machinery. This may be any convenient part, for example, a bolt or bolts in the bolt circle of a gear or sheave, a hole in a moving part or a reciprocating part such as the cross-head or valve mechanism of a pump system. This proximity-type device may function by means of Hall-Effect, photoelectric, oscillator resonance or the like, and provides a variation in signal level each time the subject part or parts of a machine become proximate to the detector. Obviously, any other suitable detector device may be employed within the spirit and scope of this invention to develop an electrical signal representative of cyclical movement of moving machine parts. For each revolution or reciprocation of the machine one (or more) changes occur in the signal level of the input circuitry 12. This change in signal level is received by a signal conditioning circuit 14. The signal conditioning circuit, which is a voltage comparator with hysteresis, achieves squaring of the incoming signal, producing a square wave at its output conductor 16 whose frequency is identical with the incoming signal of conductor 12. The square wave from the signal conditioning circuit 14 is applied via conductor 16 to a sample pulse generator circuit 18 which is a "one-shot" or monostable multivibrator circuit, and which produces a pulse of fixed length and amplitude for each negative-going or falling transition of the square wave from the signal conditioning circuit, thereby developing a sample pulse train the frequency of which is identical to that of the input signal. The sample and hold circuit is a circuit which has an input terminal, a control terminal and an output terminal. The control terminal sets the circuit in either the sample mode or the hold mode, depending upon the signal applied thereunto. In the sample mode, the voltage at the output follows exactly the voltage at the input. When the circuit is switched to the hold mode, the output holds or remains at the last input voltage prior to the mode change, regardless of further input changes, until the control switches to sample again. In its usual form, the sample and hold circuit consists of two high gain operational amplifiers, with the output of the first connected through a switch to the input of the second. The input of the second operational amplifier also has a capacitor across its input. Thus, the first amplifier drives the capacitor and second operational amplifier when the switch is closed (sample mode). When the switch opens (hold mode) the capacitor, having a charge voltage equal to the input voltage at the instant before the switch opened, drives the second operational amplifier, thus holding the input voltage. The sample pulse generator circuit 18 applies the sample pulse train via conductor 20 to a sample and hold circuit 22 which is a device well known to those skilled in the art, and which is capable of quickly sampling an incoming signal of varying amplitude when in the sample mode, and then holding the instantly sampled amplitude during those periods of time when it is not commanded to sample. Thus, during the period of time when the sample pulse is active (high), the circuit samples its analog input, and while the sample pulse is inactive (low), the circuit holds the last sampled signal level at its output.

Sample pulses are likewise applied via conductor 24 to a reset pulse generator circuit 26, which, like the sample pulse generator, is comprised of a "one shot" or monostable multivibrator circuit. The reset pulse generator produces a pulse of fixed duration and amplitude each time the sample pulse undergoes a negative transition. Thus, it may be seen that for each sample pulse, there follows a similar reset pulse, which differs from the sample pulse only in the time domain. That is, the sample pulse occurs, and its expiration triggers the occurrence of the reset pulse.

The reset pulse is applied via conductor 28 to a ramp generator circuit 30, which is a circuit well known to those skilled in the art, and is comprised of an operational amplifier integrator circuit with a transister switch to discharge the integrating capacitor thereof. Thus, so long as the reset pulse is inactive (high), the ramp generator circuit produces a voltage ramp, which is a voltage that increases steadily and smoothly with time. When the reset pulse is active (low), the voltage ramp is instantly reset to zero. The output of the ramp generator circuit is held at zero during the period when the reset pulse is active (low) and is then allowed to ramp upward again as soon as the reset pulse is inactive (high). The voltage of the ramp at any point in time is analogous to the elapsed time since the last reset pulse.

The output of the ramp generator circuit 30 is transmitted to a reciprocator circuit 32 by means of conductor 34. The reciprocator circuit is an analog divider circuit which is well known to those skilled in the art, and to which the ramp voltage is applied as a devisor, while a fixed but adjustable constant voltage is applied as a dividend. The resulting output at conductor 36 is a voltage which varies as the reciprocal of the input ramp. The fundamental physical relationship:

$$V=s/t$$

where:
 V = velocity (speed or machine RPM)
 s = Distance (A constant for reciprocating machinery)
 t = time elapsed (as measured by the ramp generator)
is maintained and a voltage output from the reciprocator circuit is produced which at any given time is a function of machine velocity or RPM. The output of the reciprocator circuit 32 is applied via conductor 36 to an analog input of the sample and hold circuit 22.

Thus, it may be seen that the tachometer circuit functions briefly as follows:

The input circuit senses machine motion, and triggers the sample pulse generator circuit 18. When the sample pulse is complete, it initiates the reset pulse generator circuit 26 which sets the ramp generator circuit 30 to zero, and then allows the ramp generator circuit to begin ramping up. The reciprocator circuit 32 calculates the reciprocal of the linear time ramp, and applies it to the sample and hold circuit 22. As the next repetition of the machine motion occurs, the sample pulse generator circuit 18 causes the sample and hold circuit 22 to sample the output of the reciprocator circuit and then hold it for display on an analog or digital volt meter that is incorporated therewith. Thus, the analog or digital volt meter of the sample and hold circuit 22 displays the speed (RPM) of the subject machinery to which the input signal conductor 12 is connected. The volt meter output at conductor 38 is buffered by an amplifier circuit 40 so that output loading effects will not be reflected in inaccuracy of the sample and hold circuit. Although only two output buffer amplifier outputs are shown at 42 and 44, as many outputs as are required may be provided.

It is possible, particularly with heavy slow speed machinery such as oil field slush pumps, for example, that the machine may decelerate to a standstill from perhaps half speed in less than one cycle of operation. Were this to occur, the sample and hold amplifier circuit 22 would retain the last voltage sampled indefinitely, even though the machinery had stopped. For this reason, the sample pulse generator circuit 18 is also coupled via conductor 46 to a missing pulse detector circuit 48. The missing pulse detector circuit is comprised of a retriggerable monostable multivibrator with its output pulse set to a period which corresponds to about 50 cycles of machine full speed operation. As long as the machinery operates at more than 2% of its rated speed, the output of this circuit is a constant, but if the machinery is stopped suddenly and no retriggering pulses are received by the missing pulse detector, after a period corresponding to 50 machine cycles, the missing pulse detector circuit 48 will supply a signal via conductor 50 to the sample and hold amplifier circuit 22. This signal overrides the "hold" command, and places the sample and hold circuit in the "sample" mode indefinitely (until another "sample" pulse resets the missing pulse detector circuit). After a period of 50 machine cycles have elapsed, the ramp function will have reached a maximum, the output of the reciprocator circuit 18 will be at a minimum, and with the sample and hold circuit in a steady state "sample" mode, the output of the reciprocator circuit 32 will be at a minimum, thus truly indicating the machinery has stopped.

Also shown in the accompanying drawings are a counter-pulse generator circuit 52 which is coupled via conductor 54 to the sample pulse generator circuit 18. The counter-pulse generator circuit 52, being fed from the sample pulse generator circuit, generates a pulse of fixed width, which is amplified by an amplifier circuit 56 coupled via conductor 58 to counter-pulse circuit 52. The amplifier circuit 56 is coupled via conductor 60 to a relay 62 having appropriate drive conductors 64 and 66 that are coupled in driving relation with a quantity of digital counters as required to totalize the number of machine cycles for the purpose of establishing periods for preventative maintenance and the like. A TTL (0.8 volt to 2.4 volt) square wave output is provided from a gate circuit 68 to drive electronic circuits such as digital computers and the like.

Figure 2:
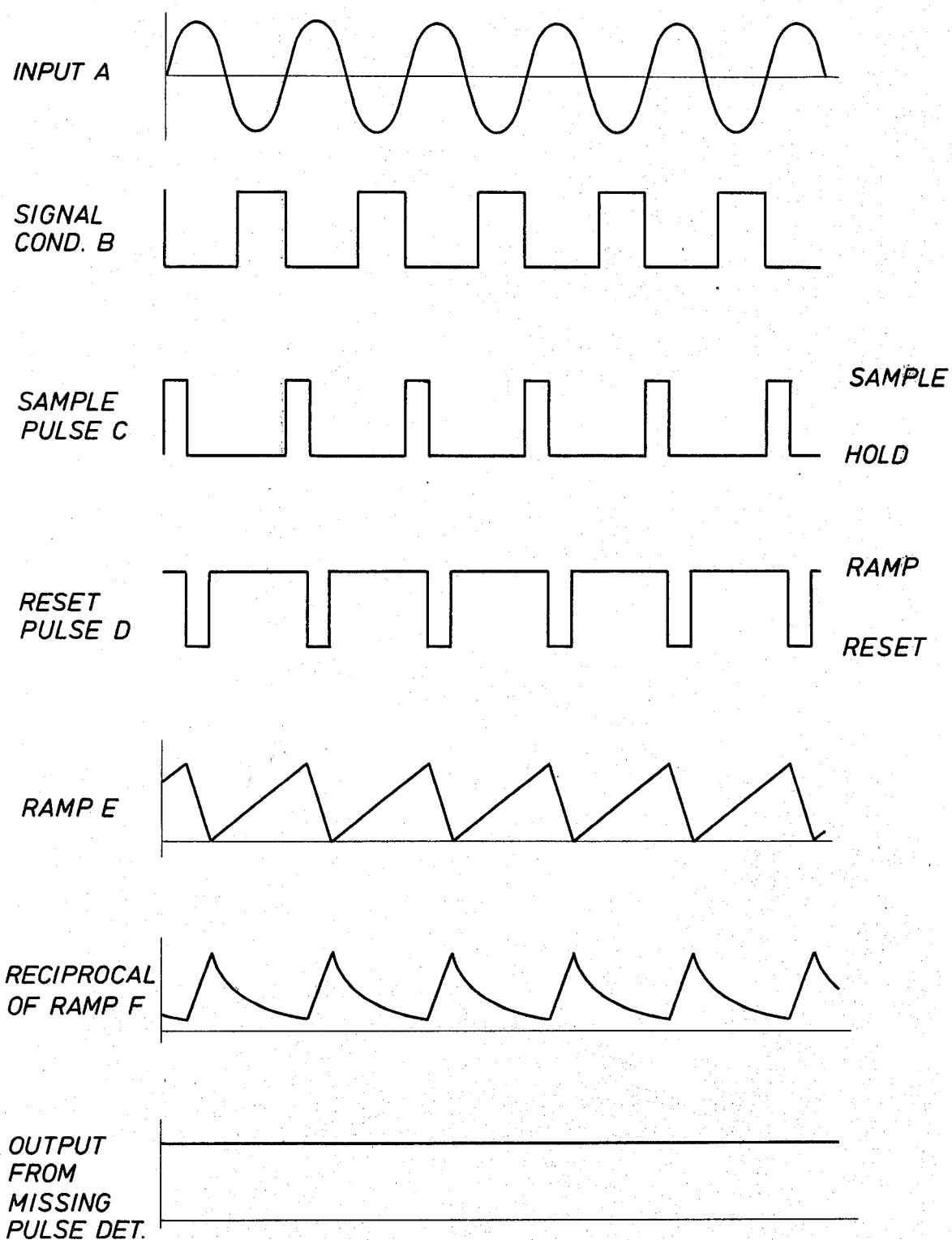
FIG. 2 is a wave-form diagram illustrating wave-forms developed by various portions of the correlated circuitry of FIG. 1.

With reference now to FIG. 2, which is a composite time sequence wave-form diagram, a simple sine wave is shown at input A. The sine wave is an unconditioned input wave which will be present at conductor 12 immediately preceeding the signal conditioning circuit 14. Although the input A is shown to be a sine wave, it should be borne in mind that it may also be a square wave or any other wave-form representing an input. Subsequent to processing of the input signal A by the signal conditioning circuit 14, the wave-form taken at conductor 16 and fed to the sample pulse generator circuit 18 will have the square form shown at B in FIG. 2. When the sample pulse is complete, it initiates the reset pulse generator circuit 26, thus developing a wave-form at conductor 24 of the configuration and time sequence illustrated at C in FIG. 2. The output of the reset pulse generator circuit 26, which will be detected at conductor 28, will have the form configuration and time sequence illustrated at D in FIG. 2. As mentioned above, the reset pulse generator circuit 26 sets the ramp generator circuit 30 to zero and then allows it to begin ramping up, thus developing a wave-form at conductor 34 having the ramp configuration and time sequence shown at E in FIG. 2. The ramp signal is then transmitted via conductor 34 to the reciprocator circuit 32 which calculates the reciprocal of the linear time ramp, thereby developing an output wave-form at conductor 36 having the reciprocal configuration shown at F in FIG. 2. The reciprocal wave-form signal is then transmitted to sample and hold circuit 22. As the next repetition of the machine motion occurs, the sample pulse generator circuit 18 causes the sample and hold circuit 22 to sample the output of the reciprocator and then hold it for display on an analog or digital volt meter that forms a portion of the sample and hold circuit.

At the lower portion of FIG. 2, an output is shown from the missing pulse detector circuit 48 which is simply a stable signal. The missing pulse detector output will remain stable unless it fails to receive retriggering pulses from the sample pulse generator circuit 18. If this occurs, the speed of the machine will have decreased to less than 2% of its related speed, evidencing a breakdown of the machinery or termination of machine operation for any one of a number of suitable reasons. The missing pulse detector circuit, in absence of appropriate triggering pulses, will then generate a signal in conductor 50 which overrides the "hold" command and places the sample and hold circuit in the "sample" mode indefinitely. The sample and hold circuit will subsequently begin normal function upon elimination of the overriding signal from the missing pulse detector circuit. This signal will be modified when the machine begins normal operation and the sample pulse generator provides a retriggering pulse at the input of the missing pulse detector circuit.

Having thus described my invention in detail, I claim:

1. A tachometer for providing accurate tachometry of ultra slow speed moving machinery and providing electrical signals representative of machine movement, said tachometer comprising:
   (a) signal conditioning circuit means receiving an input signal wave-form signal of oscillating nature and converting the input signal to a square wave signal having a frequency that is identical with the frequency of the input signal;
   (b) sample pulse generating circuit means receiving said square wave signal and producing a sample pulse train having pulses of fixed length and amplitude for each negative-going transition of said square wave;
   (c) sample/hold circuit means receiving said sample pulse train and having a "sample" mode and "hold" mode and being capable of sampling an analog signal when in the "sample" mode and holding the last sampled signal level at the output when in said "hold" mode;
   (d) reset generator circuit means receiving said sample pulse train and producing a reset pulse of fixed duration and amplitude during each negative-going transition of said sample pulse;
   (e) ramp generator circuit means being an operational amplifier integrator capacitor circuit having a transistor switch to discharge said integrating capacitor; said ramp generator circuit means receiving said reset pulse and producing a linear time ramp voltage when said reset pulse is inactive (high) and resetting said ramp voltage to zero when said reset pulse is active (low); and
   (f) reciprocator circuit means receiving said voltage ramp and producing a reciprocator output voltage being a reciprocal mathematical voltage varying as the reciprocal of said voltage ramp, said reciprocator output being an analog signal applied to said sample/hold circuit means, said analog signal being linearly proportional the speed of said machine.

2. An apparatus as recited in claim 1, wherein:
said reciprocator means maintains the fundamental physical relationship:

$$V = s/t$$

where:
V = velocity (speed or machine RFM)
s = Distance (A constant for reciprocating machinery)
t = time elapsed (as measured by said ramp generator means)

and said reciprocator means produces an analog voltage output which at any given time is a function of the velocity of said machine.

3. An apparaus as recited in claim 1, including:
missing pulse detector circuit means for receiving output pulses of said sample pulse generator circuit means and developing an output pulse set to a period corresponding to a predetermined number of machine cycles at full speed operation, said missing pulse detector circuit means being retriggered by said pulses of said sample pulse detector circuit means and, when retriggering does not occur for said predetermined period, said missing pulse detector circuit means transmitting a signal to said sample/hold circuit means overriding the "hold" command thereof and placing said sample/hold circuit means continuously in said "sample" mode until a subsequent retriggering pulse is received by said missing pulse detector "circuit" means.

4. An apparatus of claim 3, wherein said missing pulse detector circuit means comprises:
a retriggerable monostable multivibrator circuit having means for setting the time period of the output pulse thereof in accordance with machine operation.

5. A tachometer is recited in claim 1, wherein said signal conditioning means comprises:
a voltage comparitor circuit having hysteresis.

6. The apparatus of claim 1, wherein said sample pulse generator circuit means comprises:
a monostable multivibrator circuit.

7. The apparatus of claim 1, wherein said sample/hold circuit means comprises:
a sample and hold amplifier circuit.

8. The apparatus of claim 1, wherein said reset generator circuit means comprises:
a nomostable multivibrator circuit.

9. Electronic tachometer circuitry for measuring the speed of ultra slow speed moving machinery, comprising:
   (a) means for detecting machine movement and generating square wave sample pulses representative of the speed of machine movement;
   (b) reset pulse generator means receiving said sample pulses and generator reset pulses of fixed duration and amplitude for each negative-going transition of said sample pulses, said reset pulses differing from said sample pulses only in time domain;
   (c) ramp generator circuit means receiving said reset pulses and generating a linear time voltage ramp representing the elapsed time between cycles of machine operation detected, said ramp generator circuit being an operational amplifier integrating capacitor circuit having a transistor switch to charge said integrating capacitor, said integrating capacitor being charged by a constant current source producing said linear time voltage ramp;
   (d) reciprocator circuit means receiving said linear time voltage ramp and generating an analog output representing the reciprocal thereof and which is linearly proportional to the speed of the moving machinery; and
   (e) sample/hold circuit means receiving said sample pulses and also receiving said reciprocal of said linear time ramp voltage and calculating a voltage analog which is proportional to the elapsed time between cycles of machine operation, thus representing the speed of machine operation, said sample/hold circuit means sampling said sample pulses when in the sample mode and holding the instantly sampled amplitude at its output during the hold mode thereof.

10. A tachometer as recited in claim 9, wherein:
said reciprocator circuit means maintains the fundamental physical relationship:

$$V = s/t$$

where:
V = velocity (speed or machine RFM)
s = distance (a constant for reciprocating machinery)
t = time elapsed (as measured by said ramp generator means)
and said reciprocator circuit means produces a voltage output which at any given time is a function of the velocity of said machine.

11. A tachometer as recited in claim 10, wherein said reciprocator circuit means comprises:
an operational amplifier integrator circuit having a transistor switch to discharge the integrating capacitor thereof.

12. The apparatus of claim 11, wherein:
said operational amplifier integrator circuit produces a linear time voltage ramp when said reset pulse is inactive (high) and has a zero output when said reset pulse is active (high), the voltage of said linear time ramp at any point in time being analogous to the elapsed time since the last reset pulse.

13. The apparatus of claim 9, including:
missing pulse detector circuit means for receiving output pulses of said sample pulse generator means and developing an output pulse set to a period corresponding to a predetermined number of machine cycles at full speed operation, said missing pulse detector means being retriggered by said pulses of said sample pulse detector and, when retriggering does not occur for said predetermined period, said missing pulse detector means transmitting a signal to said sample/hold means overriding the "hold" command thereof and placing said sample/hold means continuously in said "sample" mode until a subsequent retriggering pulse is received by said missing pulse detector means.

14. The apparatus of claim 13, wherein said missing pulse detector circuit means comprises:
a retriggerable monostable multivibrator circuit having means for settting the time period of the output pulse thereof in accordance with machine operation.

* * * * *